Patented Aug. 8, 1950

2,518,233

UNITED STATES PATENT OFFICE 2,518,233

SYNERGISTIC ANTIOXIDANT CONTAINING AMINO ACIDS

Lloyd A. Hall, Chicago, Ill., assignor to The Griffith Laboratories, Inc.

No Drawing. Application September 11, 1946, Serial No. 696,338

6 Claims. (Cl. 260—398.5)

This invention relates to an antioxidant and more particularly to an antioxidant composition with non-toxic properties containing amino acids and employed for preserving and stabilizing such food substances as lard, oleo oil, butter, peanut butter, mayonnaise, cheese spreads, vegetable oils, fish oils, hydrogenated fats, milk powders, egg powder, sausage, bacon, oil soluble vitamins, chocolate, cocoa, cocoa butter, coconut fats, essential oils, margarine, lanolin and other fatty food products or food products containing large amounts of fatty matter which are subject to rancidity development.

The invention is further characterized by the action of small amounts of two or more materials which, when used together, exert a synergistic antioxidant action—i. e., an anti-oxygenic effect greater than the sum of the anti-oxygenic effects, if any, of the individual materials when used separately.

Oils and fats often become rancid, which in the case of otherwise edible products, renders them unfit for human consumption. Some of the constituents of oils and fats are known to possess the tendency to absorb or react with oxygen. Thus, rancidity development results primarily from the products formed during oxidation. The dissolved or absorbed oxygen usually reacts first to form peroxides and the development of peroxides may be further accelerated by moisture, heat, light or catalyst. Aldehydes, ketones, and acids of lower molecular weight may be formed in the further decomposition and these materials also impart an undesirable odor or taste to the oil, fat or food product. The evaluation of rancidity is carried out by what is referred to as the Active Oxygen Method (AOM). It pertains to the amount of peroxides developed per kilogram of fat under standard conditions of acceleration. This test is also sometimes called the Swift Stability Test. Figures greater than those for the control indicate antioxidant value.

A great deal of work has been done on antioxidants for use in food products and particularly in animal fats such as lard. Some of the suggested materials have been highly successful, but extremely expensive. Some of the most effective materials have had to be incorporated in a volatile solvent, the removal of which is expensive and cannot be accomplished at most small rendering plants. Some of the suggested products have been toxic and unfit for use in food. The use of vegetable oils in antioxidant preparations has been suggested, but it has been necessary to use these oils in such quantity as to seriously lower the melting point of the lard mixtures. I have found that some amino acids can be used in synergistic mixtures to extend the keeping time and preservation of fats and oils and other food materials and thus are unusually effective antioxidants.

The following table shows the AOM value of prime steam lard and kettle rendered lard when antioxidant amino acids are used in a ratio of 0.25%:

Table I

|  | AOM at 208° F. | |
|---|---|---|
|  | Prime Steam Lard | Kettle Rendered Lard |
| Control lard | 3.5 | 2.5 |
| dl-Threonine | 6 |  |
| dl-B-phenylalanine | 6 | 2.5 |
| d-Arginine | 8 |  |
| dl-Methionine | 11.5 |  |
| l-Tryptophane | 9.5 |  |
| Glycine | 7 |  |
| Tyrosine | 4.5 | 2.5 |
| Alanine | 5 | 3 |

It will be noted that the amino acid in Table I give antioxidant effects when used separately. Other amino acids, such as cystine, valine, serine, aspartic acid, glutamic acid, and proline do not appear to have antioxidant properties either where used separately or in synergistic mixtures. Several of the amino acids have fairly high antioxidant values, namely, methionine, tryptophane, glycine, arginine, phenylalanine, and threonine.

The following table gives data on synergistic mixtures of several of the amino acids with lecithin in lard:

Table II

AOM hours at 208° F.

Control lard _____ 4
0.10% lecithin _____ 7
0.25% tryptophane+0.10% lecithin _____ 25
0.25% methionine+0.10% lecithin _____ 29

In my previous applications, Serial Nos. 598,900, 606,282, and 606,283, on antioxidants, now issued as Patents No. 2,464,927, No. 2,500,543 and No. 2,464,928 respectively I have used gallic acid esters and ascorbyl esters in synergistic mixtures with tocopherols and lecithin. The preferred gallic acid ester which I have used is propyl gallate, but other alkyl esters containing a small number of carbon atoms in the alkyl group may be substituted. In general, methyl ethyl, propyl and butyl gallates may be employed. The ascorbyl ester is preferably ascorbyl palmitate, or other ester of a higher fatty acid. Lecithin, preferably in the crude form is employed in an amount from about five per cent to 30 per cent of the antioxidant mixture. I have now discovered that amino acids enhance the efficiency of these synergistic antioxidant mixtures. In the following table I give the composition and formulae of several examples and antioxidant data:

*Table III*

| Example | Antioxidant and Composition | | Per Cent in Lard | AOM Hours at 208° F. |
|---|---|---|---|---|
| | Control Lard | | | 2½ |
| 1 | Butyl Tyrosine | 33.33% | 0.0033 | 15 |
| | Propyl Gallate | 66.67% | 0.0067 | |
| | | 100.00% | 0.0100 | |
| 2 | Butyl Tyrosine | 1.00% | 0.00125 | 19 |
| | Propyl Gallate | 2.00% | 0.00250 | |
| | Lecithin | 17.00% | 0.02125 | |
| | Corn Oil | 80.00% | 0.01000 | |
| | | 100.00% | 0.0125 | |
| 3 | Propyl Gallate | 2.75% | 0.00343 | 20 |
| | Lecithin | 26.75% | 0.03344 | |
| | Corn Oil | 70.50% | 0.08813 | |
| | | 100.00% | 0.125 | |
| 4 | Butyl Tyrosine | 1.00% | 0.00125 | 22½ |
| | Propyl Gallate | 2.50% | 0.00313 | |
| | Lecithin | 16.00% | 0.02000 | |
| | Corn Oil | 80.50% | 0.10063 | |
| | | 100.00% | 0.125 | |
| 5 | Glycine | 2.00% | 0.00250 | 24 |
| | Propyl Gallate | 2.00% | 0.00250 | |
| | Lecithin | 16.00% | 0.02000 | |
| | Corn Oil | 80.00% | 0.10000 | |
| | | 100.00% | 0.125 | |
| 6 | Glycine | 50.00% | 0.0050 | 24½ |
| | Propyl Gallate | 50.00% | 0.0050 | |
| | | 100.00% | 0.0100 | |
| 7 | Glycine | 2.50% | 0.00313 | 29 |
| | Propyl Gallate | 2.50% | 0.00313 | |
| | Lecithin | 16.00% | 0.02000 | |
| | Corn Oil | 79.00% | 0.09875 | |
| | | 100.00% | 0.125 | |

In examples 1 and 6, the synergistic antioxidant is a crystalline powder, which is simply dissolved in the product to be stabilized, for instance lard, by agitation and heating at about 210° to 220° F. In the other examples, the various ingredients are solubilized in corn or other suitable vegetable oil with the aid of heat to 220° F. and agitation. Corn, peanut, and other vegetable oils contain small amounts of tocopherols which give some synergistic antioxidant properties in my above formulae. Thus, all my synergistic antioxidant compositions in Table III are liquids except 1 and 6. They are added to the material to be stabilized at any desirable point at temperatures not exceeding 240° F. by agitation. In the case of addition to lard, my liquid synergistic antioxidants are preferably mixed into the refined lard at 140° to 150° F. before it goes to the lard roll or votator. There is no separation of the antioxidant when the lard is cooled, no taste or odor imparted and no effect on melting point when my synergistic antioxidants are used in the amount of 0.125% to 0.500%. Neither is there substantial decomposition of the antioxidant in fats, such as lard, at baking or cooking temperatures to 375° F.

In certain instances a vegetable oil should not be included in a synergistic antioxidant mixture for the reason that it may lower the melting point of the fat in which this type of antioxidant is used. For this reason, I have made synergistic antioxidant mixtures using lard and a hydrogenated cotton seed oil as a part of the formula for my new synergistic antioxidant. Data is given of these compositions in the following examples:

*Table IV*

| Example | Antioxidant and Composition | | Per Cent in Lard | AOM Hours at 208° F. |
|---|---|---|---|---|
| | Control Lard | | | 2½ |
| 1 | Glycine | 0.625% | 0.00313 | 21½ |
| | Propyl Gallate | 0.625% | 0.00313 | |
| | Lard | 98.75% | 0.49375 | |
| | | 100.00% | 0.50000 | |
| 2 | Glycine | 0.625% | 0.00313 | 24 |
| | Propyl Gallate | 0.625% | 0.00313 | |
| | Hydrogenated Fat | 98.75% | 0.49374 | |
| | | 100.00% | 0.5000 | |
| 3 | Propyl Gallate | 0.625% | 0.00313 | 28½ |
| | Lecithin | 4.000% | 0.02000 | |
| | Lard | 95.375% | 0.47687 | |
| | | 100.00% | 0.5000 | |
| 4 | Glycine | 0.625% | 0.00313 | 29 |
| | Propyl Gallate | 0.625% | 0.00313 | |
| | Lecithin | 8.000% | 0.04000 | |
| | Lard | 90.75% | 0.45375 | |
| | | 100.00% | 0.5000 | |
| 5 | Glycine | 0.625% | 0.00313 | 30 |
| | Propyl Gallate | 0.625% | 0.00313 | |
| | Lecithin | 4.000% | 0.02000 | |
| | Lard | 94.75% | 0.47375 | |
| | | 100.00% | 0.5000 | |
| 6 | Glycine | 0.625% | 0.00313 | 33 |
| | Propyl Gallate | 0.625% | 0.00313 | |
| | Lecithin | 8.000% | 0.04000 | |
| | Hydrogenated Fat | 90.75% | 0.45375 | |
| | | 100.00% | 0.5000 | |
| 7 | Glycine | 0.625% | 0.00313 | 34½ |
| | Propyl Gallate | 0.625% | 0.00313 | |
| | Lecithin | 4.000% | 0.02000 | |
| | Hydrogenated Fat | 94.75% | 0.47375 | |
| | | 100.00% | 0.5000 | |

The products in the synergistic mixtures in Table IV were made by weighing out the required amount of materials, then adding the melted lard or hydrogenated fat at about 170° F., stirring rapidly at first to get a uniform mixture and then stirring very slightly until the lard or hydrogenated fat congealed. The synergistic mixtures made with lard or hydrogenated fat were used as antioxidants on the basis of 0.50%, but the respective amounts of glycine and propyl gallate are the same in each example formula. Lecithin addition materially increases the antioxidant action in these formulae and thus shows synergistic action. In the case of the products as shown in Table IV, the lard and hydrogenated fat are merely used as convenient carriers for products where such carriers are desired, but hydrogenated fat gives slightly higher AOM values. The synergistic products in this instance are plastic, fat soluble mixtures easily used.

I have further discovered that certain organic acids such as benzoic, fumaric, tartaric, and citric acids produce the synergistic effects in combination with the antioxidants herein disclosed, as well as with other substances as to which reference is made to my accompanying application, Serial No. 696,339, filed September 11, 1946, now Patent No. 2,511,802.

The following table illustrates examples of the use of such acids.

Table V

| Example | Antioxidant and Composition | Per Cent in Lard | AOM Hours at 208° F. |
|---|---|---|---|
| | Control Lard | | 2½ |
| 1 | Butyl Tyrosine 30.00% | 0.0030 | 15½ |
| | Propyl Gallate 60.00% | 0.0060 | |
| | Fumaric Acid 10.00% | 0.0010 | |
| | 100.00% | 0.010 | |
| 2 | Butyl Tyrosine 33.00% | 0.0033 | 17½ |
| | Propyl Gallate 65.00% | 0.0065 | |
| | Benzoic Acid 2.00% | 0.0002 | |
| | 100.00% | 0.010 | |
| 3 | Butyl Tyrosine 30.00% | 0.0030 | 18 |
| | Propyl Gallate 60.00% | 0.0060 | |
| | Benzoic Acid 10.00% | 0.0010 | |
| | 100.00% | 0.010 | |
| 4 | Glycine 35.00% | 0.0035 | 19½ |
| | Propyl Gallate 65.00% | 0.0065 | |
| | 100.00% | 0.0100 | |
| | Benzoic Acid | 0.0100 | 20 |
| | | 0.0200 | |
| 5 | Butyl Tyrosine 33.00% | 0.0033 | 20 |
| | Propyl Gallate 65.00% | 0.0065 | |
| | Fumaric Acid 2.00% | 0.0002 | |
| | 100.00% | 0.010 | |
| 6 | Propyl Gallate 2.75% | 0.00343 | 22½ |
| | Lecithin 26.75% | 0.03344 | |
| | Refined Corn Oil 70.50% | 0.09913 | |
| | 100.00% | 0.125 | |
| | Glycine | 0.0500 | |
| | | 0.1750 | |
| 7 | Glycine 0.50% | 0.00063 | 24 |
| | Propyl Gallate 3.00% | 0.00375 | |
| | Lecithin 18.50% | 0.02313 | |
| | Crude Corn Oil 78.00% | 0.09750 | |
| | 100.00% | 0.125 | |
| 8 | Propyl Gallate | 0.0100 | 25 |
| 9 | Propyl Gallate | 0.0100 | 26 |
| | Benzoic Acid | 0.0100 | |
| | | 0.0200 | |
| 10 | Glycine 30.00% | 0.0030 | 26 |
| | Propyl Gallate 60.00% | 0.0060 | |
| | Benzoic Acid 10.00% | 0.0010 | |
| | 100.00% | 0.010 | |
| 11 | Glycine 30.00% | 0.0030 | 26½ |
| | Propyl Gallate 60.00% | 0.0060 | |
| | Fumaric Acid 10.00% | 0.0010 | |
| | 100.00% | 0.010 | |
| 12 | Propyl Gallate 2.75% | 0.00343 | 27 |
| | Lecithin 26.75% | 0.03344 | |
| | Refined Corn Oil 70.50% | 0.09913 | |
| | 100.00% | 0.125 | |
| | Glycine | 0.0100 | |
| | | 0.135 | |
| 13 | Glycine 33.00% | 0.0033 | 28 |
| | Propyl Gallate 65.00% | 0.0065 | |
| | Benzoic Acid 2.00% | 0.0002 | |
| | 100.00% | 0.010 | |
| 14 | Glycine 33.00% | 0.0033 | 28 |
| | Propyl Gallate 65.00% | 0.0065 | |
| | Fumaric Acid 2.00% | 0.0002 | |
| | 100.00% | 0.010 | |
| 15 | Glycine 35.00% | 0.0035 | 37 |
| | Propyl Gallate 65.00% | 0.0065 | |
| | 100.00% | 0.0100 | |
| | Citric Acid | 0.0100 | |
| | | 0.0200 | |
| 16 | Propyl Gallate | 0.0100 | 48½ |
| | Citric Acid | 0.0100 | |
| | | 0.0200 | |

The examples in Table V are crystalline powders with the exception of Examples 6, 7 and 12, in which a tocopherol containing vegetable oil, such as corn oil, is employed as a solubilizing agent or carrier. In these cases the ingredients may be mixed together and heated at 150° F., with agitation until dissolved.

It is apparent from the foregoing that various synergistic compositions comprising amino acids can be used to advantage as antioxidants. While a number of amino acids can be used in such synergistic antioxidants, I prefer to use glycine, in combination with propyl gallate, lecithin and tocopherols. I have chosen glycine as my preferred amino acid because of cost, availability and its excellent stabilizing and preservative qualities. I have also used as one of my synergists, the esters of some of the amino acids, such as butyl tyrosine. The synergistic action of amino acid esters have thus been proven valuable as antioxidant materials. The synergistic antioxidants of the present invention not only are relatively inexpensive, but they can be used easily by simply distributing them through the product to be stabilized without the necessity of a special solvent or expensive process or equipment.

The foregoing detailed description is given for clearness of understanding only, and no unnecessary limitations should be understood therefrom, for some modifications will be obvious to those skilled in the art.

I claim:

1. A fatty composition consisting predominantly of glycerides of fatty acid and containing not substantially more than 0.25% of an antioxidant composition comprising a synergistic mixture of an amino acid compound of the class consisting of glycine, threonine, phenylalanine, arginine, methionine, tryptophane, tyrosine, butyl tyrosine, and alanine; a gallic acid ester and an organic acid of the class consisting of benzoic, fumaric, tartaric and citric.

2. A composition as set forth in claim 1 in which the gallic acid ester is propyl gallate.

3. A composition as set forth in claim 1 in which the organic acid is citric acid.

4. A composition comprising approximately 35 parts of glycine, 65 parts of propyl gallate and 100 parts of citric acid.

5. An antioxidant composition comprising an amino acid compound of the class consisting of glycine, threonine, phenylalanine, arginine, methionine, tryptophane, tyrosine, butyl tyrosine and alanine; an organic acid of the class consisting of benzoic, fumaric, tartaric and citric; an ester of the class consisting of gallic acid esters and ascorbyl esters; and lecithin, said amino acid, organic acid, ester and lecithin being present in such proportions as to give a synergistic effect in said antioxidant composition.

6. An antioxidant composition comprising an amino acid compound of the class consisting of glycine, threonine, phenylalanine, arginine, methionine, tryptophane, tyrosine, butyl tyrosine and alanine; an organic acid of the class consisting of benzoic, fumaric, tartaric and citric; an ester of the class consisting of gallic acid esters and ascorbyl esters; said amino acid, organic acid and ester being present in such proportions as to give a synergistic effect in said antioxidant composition.

LLOYD A. HALL.

(References on following page)

REFERENCES CITED

The following references are of record in the file of this patent:

UNITED STATES PATENTS

| Number | Name | Date |
|---|---|---|
| 1,869,469 | Divine | Aug. 2, 1932 |
| 2,047,642 | Marvel | July 4, 1936 |
| 2,223,244 | Bohm et al. | Nov. 26, 1940 |
| 2,290,064 | Musher | July 14, 1942 |
| 2,377,029 | Norris | May 29, 1945 |
| 2,383,815 | Riemenschneider et al. | Aug. 28, 1945 |
| 2,397,920 | Coe et al. | Apr. 9, 1946 |